(12) United States Patent
Takahashi et al.

(10) Patent No.: US 10,808,117 B2
(45) Date of Patent: *Oct. 20, 2020

(54) POLYACETAL RESIN COMPOSITION AND MOLDED ARTICLE THEREOF

(71) Applicant: Asahi Kasei Kabushiki Kaisha, Tokyo (JP)

(72) Inventors: Yosuke Takahashi, Tokyo (JP); Takaaki Miyoshi, Tokyo (JP)

(73) Assignee: Asahi Kasei Kabushiki Kaisha, Tokyo (JP)

(*) Notice: Subject to any disclaimer, the term of this patent is extended or adjusted under 35 U.S.C. 154(b) by 48 days.

This patent is subject to a terminal disclaimer.

(21) Appl. No.: 16/029,486

(22) Filed: Jul. 6, 2018

(65) Prior Publication Data

US 2018/0312684 A1    Nov. 1, 2018

Related U.S. Application Data

(63) Continuation of application No. 15/300,064, filed as application No. PCT/JP2015/059657 on Mar. 27, 2015, now Pat. No. 10,030,136.

(30) Foreign Application Priority Data

Mar. 28, 2014  (JP) ................. 2014-070201

(51) Int. Cl.
| | | |
|---|---|---|
| C08L 59/00 | (2006.01) | |
| C08K 3/40 | (2006.01) | |
| C08L 59/02 | (2006.01) | |
| C08G 2/38 | (2006.01) | |
| C08L 87/00 | (2006.01) | |
| C08K 7/14 | (2006.01) | |
| C08K 9/08 | (2006.01) | |
| C08L 23/06 | (2006.01) | |
| C08L 59/04 | (2006.01) | |

(52) U.S. Cl.
CPC ............. *C08L 59/00* (2013.01); *C08G 2/38* (2013.01); *C08K 3/40* (2013.01); *C08K 7/14* (2013.01); *C08K 9/08* (2013.01); *C08L 23/06* (2013.01); *C08L 59/02* (2013.01); *C08L 59/04* (2013.01); *C08L 87/005* (2013.01)

(58) Field of Classification Search
CPC .......... C08L 59/00; C08L 23/06; C08L 59/02; C08L 59/04; C08L 87/005; C08G 2/38; C08G 3/40; C08K 3/40; C08K 7/14; C08K 9/08
USPC ........................................................ 523/208
See application file for complete search history.

(56) References Cited

U.S. PATENT DOCUMENTS

| | | | |
|---|---|---|---|
| 5,677,055 A | 10/1997 | Ohkawachi et al. | |
| 5,889,102 A | 3/1999 | Haack et al. | |
| 5,942,568 A | 8/1999 | Niino et al. | |
| 10,030,136 B2* | 7/2018 | Takahashi | C08G 2/38 |
| 2001/0007006 A1 | 7/2001 | Tanimura et al. | |
| 2002/0016395 A1 | 2/2002 | Niino et al. | |
| 2002/0137809 A1 | 9/2002 | Kogure et al. | |
| 2006/0058457 A1 | 3/2006 | Kawaguchi | |
| 2008/0039567 A1 | 2/2008 | Shimoda et al. | |
| 2009/0298981 A1 | 12/2009 | Nagai et al. | |
| 2013/0102718 A1 | 4/2013 | Markgraf et al. | |
| 2013/0331488 A1 | 12/2013 | Markgraf et al. | |
| 2015/0034882 A1 | 2/2015 | Inagaki et al. | |
| 2015/0294750 A1 | 10/2015 | Inagaki et al. | |

FOREIGN PATENT DOCUMENTS

| | | |
|---|---|---|
| CN | 101466785 A | 6/2009 |
| JP | H09-272802 A | 10/1997 |
| JP | H11-181231 A | 7/1999 |
| JP | 2001-234025 A | 8/2001 |
| JP | 2004-359791 A | 12/2004 |
| JP | 2006-037267 | 2/2006 |
| JP | 2008-044995 A | 2/2008 |
| JP | 2009-269996 | 11/2009 |
| JP | 2013-539810 A | 10/2013 |
| JP | 2014-534301 A | 12/2014 |
| WO | 1996/012765 A1 | 5/1996 |
| WO | 2001/009213 A1 | 2/2001 |

OTHER PUBLICATIONS

International Search Report issued in corresponding International Patent Application No. PCT/JP2015/059657 dated Jun. 16, 2015.
European Search Report issued in counterpart European Patent Application No. 15769383.9 dated Mar. 17, 2017.
Kawaguchi et al., "Tensile Behavior of Glass-Fiber-Filled Polyacetal: Influence of the Functional Groups of Polymer Matrices." Journal of Applied Polymer Science, 107: 667-673 (2008).
Hashemi et al., "Mechanical property relationships in glass-filled polyoxymethylene," Journal of Materials Science, 31: 5017-5025 (1996).
Zengin et al., "Glass bead grafting with poly(carboxylic acid) polymers and maleic anhydride copolymers," Polymers for Advanced Technologies, 19: 105-113 (2008).
International Preliminary Report on Patentability and Written Opinion issued in corresponding International Application Patent No. PCT/JP2015/059657 dated Oct. 4, 2016.

\* cited by examiner

*Primary Examiner* — Hannah J Pak
(74) *Attorney, Agent, or Firm* — Morgan, Lewis & Bockius LLP

(57) ABSTRACT

An object of the invention is to provide a resin composition, from which a molded article having high durability, sliding property and wear resistance can be produced with a high productivity. The present invention provides a polyacetal resin composition containing 100 parts by mass of a polyacetal resin (A) and 10 parts by mass or more and 100 parts by mass or less of a glass filler (B), in which when a molded article formed of the polyacetal resin composition by molding is fractured by application of tensile force, the surface of the glass filler (B) protruding from a fractured surface of a fractured molded article is covered with a component containing the polyacetal resin (A) having an average thickness of 0.2 μm or more and 3.0 μm or less.

6 Claims, 1 Drawing Sheet

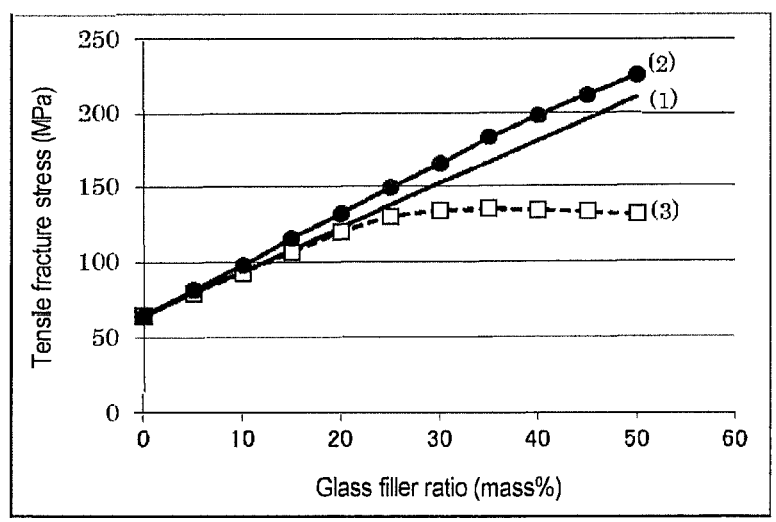

POLYACETAL RESIN COMPOSITION AND MOLDED ARTICLE THEREOF

TECHNICAL FIELD

The present invention relates to a polyacetal resin composition and a molded article thereof.

BACKGROUND ART

A polyacetal resin has excellently balanced properties including mechanical strength such as bending elastic modulus and tensile fracture stress, chemical resistance, sliding property and wear resistance, and is easily processed. Because of this, the polyacetal resin is used as a typical engineering plastic widely used in parts such as machinery parts of electrical equipment and automotive parts.

In particular, for automobile parts requiring durability, a polyacetal resin composition reinforced with an inorganic filler is used. The "durability" means long fracture lifetime, for example, under a predetermined stress, and, in other words, creep resistance.

In the polyacetal resin composition reinforced with an inorganic filler in order to improve durability, the polyacetal resin is polymerized and the terminal group of the polyacetal resin is controlled.

Patent Literature 1 discloses a polyacetal resin composition containing a polyacetal resin and a fibrous inorganic filler for improving creep resistance. Patent Literature 1 also discloses that as the molecular weight of a polyacetal resin increases, creep resistance is improved.

Patent Literature 2 discloses a method involving using a plurality of polyacetal resins having different contents of a terminal hydroxyl group in combination in a polyacetal resin composition containing a glass inorganic filler and a polyacetal resin, to improve interface adhesion between the glass inorganic filler and the polyacetal resin.

Patent Literature 3 discloses that adhesion to e.g., a glass fiber is improved by using ABA type block copolymer containing a polyacetal skeleton.

Also, as the industrial field of a polyacetal resin is enlarged, it has been desired to improve wear resistance. In an attempt to improve wear resistance, it has been investigated to add an ultrahigh molecular weight polyethylene to a resin composition.

Patent Literature 4 discloses that a lubricant is added in order to improve the wear resistance of a polyacetal resin composition containing a glass fiber. Patent Literature 4 also discloses that an ultrahigh molecular weight polyethylene is preferable as a lubricant.

Patent Literature 5 discloses that a tribology modifier is added to a polyacetal resin composition containing a glass fiber in order to improve mechanical strength, wear resistance and sliding property. In particular, the literature discloses that an ultrahigh molecular weight polyethylene having an average molecular weight beyond $1.0 \times 10^6$ g/mole is preferable as a tribology modifier.

CITATION LIST

Patent Literatures

Patent Literature 1: Japanese Patent Laid-Open No. 11-181231
Patent Literature 2: Japanese Patent Laid-Open No. 2004-359791
Patent Literature 3: International Publication No. WO 2001/009213
Patent Literature 4: Japanese Patent Laid-Open No. 9-272802
Patent Literature 5: National Publication of International Patent Application No. 2014-534301

SUMMARY OF INVENTION

Technical Problem

Recently, in machinery parts and automotive parts using a polyacetal resin, further improvement in performance and quality thereof has been desired.

Improvement in performance, more specifically, refers to improvement of mechanical strength, durability and wear resistance. The improvement in quality, more specifically, refers to suppression of poor appearance.

However, if a polyacetal resin is polymerized to improve durability, fluidity decreases and molding becomes difficult, causing quality deterioration such as poor appearance.

If the number of terminal hydroxyl groups of a polyacetal resin increases, thermal stability decreases, causing quality deterioration such as poor appearance (silver streaks) during molding.

If an ultrahigh molecular weight polyethylene is added to improve wear resistance, chips are likely to generate due to dropout of e.g., the ultrahigh molecular weight polyethylene. When the amount of chips increases, malefaction of feeding to a molding machine frequently occurs, extending the duration of a molding cycle. As a result, productivity may decrease.

From the conventional polyacetal resin compositions disclosed in Patent Literatures 1 to 5, it was impossible to produce a molded article having excellent durability, high wear resistance and mechanical strength as well as excellent in appearance.

The problem to be solved by the present invention is to provide a resin composition from which a molded article having high durability, sliding property and wear resistance can be produced with a high productivity.

Solution to Problem

The present inventors have conducted intensive studies with a view to solving the above problem. As a result, they surprisingly found that the above problem can be solved by a polyacetal resin composition containing a predetermined amount of glass filler, from which a molded article having specific characteristics can be obtained and accomplished the present invention.

More specifically, the present invention is as follows.

[1]

A polyacetal resin composition containing 100 parts by mass of a polyacetal resin (A) and 10 parts by mass or more and 100 parts by mass or less of a glass filler (B) wherein, when a molded article formed of the polyacetal resin composition by molding is fractured by application of tensile force, the surface of the glass filler (B) protruding from a fractured surface of a fractured molded article is covered with a component containing the polyacetal resin (A) having an average thickness of 0.2 µm or more and 3.0 µm or less.

[2]

A polyacetal resin composition containing 100 parts by mass of a polyacetal resin (A) and 10 parts by mass or more and 100 parts by mass or less of a glass filler (B) wherein, a tensile fracture stress of a molded article obtained by molding the polyacetal resin composition and measured in accordance with ISO527-1 is 135 MPa or more;

a bending elastic modulus of the molded article measured in accordance with ISO178 is 7500 MPa or more; and a value of (tensile fracture stress−65) (MPa)/glass filler ratio (mass %) is 2.90 or more.

[3]

The polyacetal resin composition according to [2], wherein when the molded article formed of the polyacetal resin composition by molding is fractured by application of tensile force, the surface of the glass filler (B) protruding from a fractured surface of a fractured molded article is covered with a component containing the polyacetal resin (A) having an average thickness of 0.2 μm or more and 3.0 μm or less.

[4]

The polyacetal resin composition according to any one of [1] to [3], further containing a polyethylene resin (C) having a weight-average molecular weight of 500,000 or less in an amount of 0.5 parts by mass or more and 8 parts by mass or less based on 100 parts by mass of the polyacetal resin (A).

[5]

The polyacetal resin composition according to [4], wherein the polyethylene resin (C) having a weight-average molecular weight of 500,000 or less has a melting point of 115° C. or less.

[6]

The polyacetal resin composition according to any one of [1] to [5], wherein at least one acid is contained as a material having a function of modifying the surface of the glass filler (B).

[7]

The polyacetal resin composition according to [6], wherein the acid is carboxylic acid.

[8]

The polyacetal resin composition according to any one of [1] to [7], wherein the polyacetal resin (A) contains a block component.

[9]

The polyacetal resin composition according to [8], wherein the block component is a hydrogenated polybutadiene component.

[10]

A molded article obtained by molding the polyacetal resin composition according to any one of [1] to [9].

[11]

The molded article according to [10], wherein a polyethylene resin (C) having a weight-average molecular weight of 500,000 or less is contained; an amount of the polyethylene resin (C) having a weight-average molecular weight of 500,000 or less in a surface layer of the molded article is larger than an amount of the polyethylene resin (C) having a weight-average molecular weight of 500,000 or less in a layer surface deeper than 1,000 μm from the surface layer of the molded article as measured by cutting out the layer.

[12]

A method for preparing the polyacetal resin composition according to any one of [1] to [9], comprising a step of modifying a surface of the glass filler (B) with a substance containing at least one acid and having a function of modifying the surface of the glass filler (B), and a step of mixing the glass filler modified and the polyacetal resin (A).

Advantageous Effects of Invention

According to this invention, it is possible to provide a resin composition from which a molded article having high durability, sliding property and wear resistance can be produced with a high productivity.

BRIEF DESCRIPTION OF DRAWING

The FIGURE shows the relationship between tensile fracture stress (MPa) and glass filler ratio (mass %).

DESCRIPTION OF EMBODIMENTS

Now, an embodiment (hereinafter referred to as "the embodiment") for carrying out the invention will be more specifically described. The following embodiment is just an example for explaining the present invention and should not be construed as limiting the present invention to the following contents. The present invention can be modified in various ways and carried out within the scope of the invention.

[Polyacetal Resin Composition]

The polyacetal resin composition of the embodiment is a polyacetal resin composition containing 100 parts by mass of a polyacetal resin (A) and 10 parts by mass or more and 100 parts by mass or less of a glass filler (B), in which when a molded article formed of the polyacetal resin composition by molding is fractured by application of tensile force, the surface of the glass filler (B) protruding from a fractured surface of a fractured molded article is covered with a component containing the polyacetal resin (A) having an average thickness of 0.2 μm or more and 3.0 μm or less.

In the embodiment, the content of the glass filler (B) based on 100 parts by mass of the polyacetal resin (A) is 10 parts by mass or more and 100 parts by mass or less.

If the content is 10 parts by mass or more, mechanical strength and creep resistance are improved.

In contrast, if the content is 100 parts by mass or less, mutual contact between glass filler during molding can be avoided to suppress the fracture of the glass filler. Because of this, mechanical strength and creep resistance are improved. Further, if the content is 100 parts by mass or less, extrusion molding can be stably performed and poor appearance of the resultant molded article can be suppressed.

The lower limit value of the content is preferably 12 parts by mass, more preferably 15 parts by mass, further preferably 20 parts by mass and further more preferably 25 parts by mass.

The upper limit value of the content is preferably 90 parts by mass, more preferably 80 parts by mass, further preferably 75 parts by mass and further more preferably 70 parts by mass.

In the embodiment, if a molded article formed of the polyacetal resin composition by molding is fractured by application of tensile force, the average thickness of a component containing the polyacetal resin composition covering the surface of the glass filler (B) protruding from a fractured surface of a fractured molded article is 0.2 μm or more and 3.0 μm or less.

If the average thickness is 0.2 μm or more, creep resistance and mechanical strength are improved. In addition, generation of chips is suppressed and the poor appearance of the molded article to be obtained can be suppressed, with the result that the quality thereof improves. In addition, since a molding cycle can be shortened, productivity is improved.

In contrast, if the average thickness is 3.0 μm or less, the flowability of the polyacetal resin composition can be suppressed from decreasing and the poor appearance of the molded article can be suppressed.

The lower limit value of the average thickness is preferably 0.3 μm and more preferably 0.4 μm.

The upper limit value of the average thickness is preferably 2.5 μm and more preferably 2.0 μm.

In the embodiment, the tensile fracture of the molded article is carried out by using small tensile-test pieces of a molded article according to ISO294-1 obtained by injection molding of a polyacetal resin composition, at a tension rate of 50 mm/min.

In the embodiment, in a molded article having an arbitrary shape, the average thickness of the component containing the polyacetal resin composition covering the surface of the glass filler (B) may be obtained by using small tensile-test pieces of a molded article, which are reprocessed by hot press from the molded article having an arbitrary shape.

The hot press for reprocessing a molded article into small tensile-test pieces is carried out at a temperature of 220° C. or less within 5 minutes. In this manner, the molded article can be reprocessed without affecting the average thickness of the component containing the polyacetal resin composition covering the surface of the glass filler (B).

In the case where a molded article having an arbitrary shape cannot be reprocessed into small tensile-test pieces depending upon e.g., the size and shape of the molded article, the molded article having an arbitrary shape may be directly used for measurement of tensile fracture stress.

In the embodiment, the average thickness of the component containing the polyacetal resin composition covering the surface of the glass filler (B) (which protrudes from a fracture surface of the molded article fractured by application of tensile force) can be obtained through observation of a fracture surface of the molded article fractured by application of tensile force by a scanning electron microscope (SEM).

Now, a method for obtaining an average thickness will be more specifically described by taking a glass fiber as an example of the glass filler (B); however, the method is not particularly limited to this.

In the embodiment, in obtaining the average thickness of the component containing the polyacetal resin composition covering the surface of a glass fiber, it is preferable to select glass fibers present near the center of a fracture surface of a molded article fractured by application of tensile force as the glass fibers to be used.

First, 50 glass fibers protruding from a fracture surface are selected at random. Next, the layer covering the surface of each of the glass fibers is observed and the thickness of the layer is measured. If the thickness of the layer is not uniform, a maximum value is employed as the thickness of the layer. The thickness values of 50 layers are arithmetically averaged to computationally obtain the average thickness.

If the surface of a glass fiber is uniformly covered with the resin component, there are some cases where the boundary between the glass fiber and the layer covering the surface thereof is not clear. In this case, the diameter of a single glass fiber may be used in calculating thickness. For example, in the case where the surface of the glass fiber having a circular cross-section is uniformly covered with a resin component, the thickness of the layer covering the surface is obtained in accordance with the following expression:

Thickness of layer covering the surface=(diameter of glass fiber including the layer−diameter of a glass fiber alone)/2

The diameter of the glass fiber alone can be obtained by measuring the remaining matter after the resin component is removed from the molded article.

Examples of the method for removing a resin component from a molded article include a method involving burning the resin component in the molded article at a sufficiently high temperature (400° C. or more); and a method involving removing the resin component in the molded article by soaking it in a solvent dissolving the polyacetal resin (A).

In the embodiment, it is preferable that the surface of the glass filler (B) is covered with a component containing a polyacetal resin (A), in an area ratio of preferably 50% or more, more preferably 70% or more, further preferably 80% or more and further more preferably 90% or more.

If the area ratio is 50% or more, the creep resistance of a molded article is more improved.

To cover the surface of the glass filler (B) with a component containing the polyacetal resin composition and having an average thickness 0.2 μm or more and 3.0 μm or less, for example, using a block copolymer described later as the polyacetal resin (A) and using a substance containing an acid described later as the substance (hereinafter sometimes referred to as a "film-forming agent") having a function of modifying the surface of the glass filler (B), are mentioned.

Of them, if a block copolymer and a film-forming agent containing an acid are used in combination, the interface adhesion between a polyacetal resin (A) and a glass filler (B) is dramatically improved and the average thickness of the component containing the polyacetal resin composition covering the surface of the glass filler (B) is increased.

In order to control the average thickness to fall within the above range, in preparing the polyacetal resin composition by melt-kneading, it is effective to knead the glass filler (B) with the polyacetal resin (A) for a longer time. It is generally considered that a glass filler is desirably kneaded for a time period as short as possible in melt-kneading of a resin composition; however, an opposite tendency is observed for the embodiment. More specifically, in supplying the glass filler (B) from a side feeder during extrusion kneading, the glass filler (B) may be supplied from a further upstream side.

In the embodiment, a component containing a polyacetal resin composition constituting the layer covering the surface of the glass filler (B) contains the polyacetal resin (A) as a main component and may be a resin component containing a polyethylene resin (C) having a weight-average molecular weight of 500,000 or less and/or e.g., a stabilizer.

The polyacetal resin composition of the embodiment is a polyacetal resin composition containing 100 parts by mass of a polyacetal resin (A) and 10 parts by mass or more and 100 parts by mass or less of a glass filler (B), in which the tensile fracture stress of a molded article obtained by molding the polyacetal resin composition and measured in accordance with ISO527-1 is 135 MPa or more; the bending elastic modulus of the molded article measured in accordance with ISO178 is 7500 MPa or more; and the value of (tensile fracture stress−65) (MPa)/glass filler ratio (mass %) is 2.90 or more.

In the embodiment, the content of the glass filler (B) based on 100 parts by mass of the polyacetal resin (A) is 10 parts by mass or more and 100 parts by mass or less.

If the content is 10 parts by mass or more, mechanical strength and creep resistance are improved.

In contrast, if the content is 100 parts by mass or less, mutual contact between glass filler during molding can be avoided to suppress the fracture of the glass filler. Because of this, mechanical strength and creep resistance are improved. In addition, flowability is improved. Thus, extrusion molding can be stably performed and the poor appearance of the molded article can be suppressed.

The lower limit value of the content is preferably 12 parts by mass, more preferably 15 parts by mass, further preferably 20 parts by mass and further more preferably 25 parts by mass.

The upper limit value of the content is preferably 90 parts by mass, more preferably 80 parts by mass, further preferably 75 parts by mass and further more preferably 70 parts by mass.

In the embodiment, the tensile fracture stress measured in accordance with ISO527-1 of a molded article obtained by molding the polyacetal resin composition is 135 MPa or more.

The tensile fracture stress is preferably 140 MPa or more, more preferably 145 MPa or more, further preferably 150 MPa or more and further more preferably 155 MPa or more.

In the embodiment, the bending elastic modulus of a molded article obtained by molding the polyacetal resin composition and measured in accordance with ISO178 is 7500 MPa or more.

The bending elastic modulus is preferably 8000 MPa or more, more preferably 8500 MPa or more, further preferably 9000 MPa or more and further more preferably 9500 MPa or more.

If a molded article has a tensile fracture stress of 135 MPa or more and a bending elastic modulus of 7500 MPa or more, the molded article can find a use requiring higher mechanical strength.

If a molded article has a bending elastic modulus of 7500 MPa or more, the thickness of the molded article can be reduced, successfully attaining size and weight reduction of parts.

In the embodiment, the tensile fracture stress and bending elastic modulus of a molded article are measured by using small tensile-test pieces of a molded article, which are obtained by injection molding of a polyacetal resin composition in accordance with ISO294-1.

In the embodiment, the tensile fracture stress and bending elastic modulus of a molded article having an arbitrary shape are obtained by using small tensile-test pieces of a molded article reprocessed by hot press from the molded article having an arbitrary shape.

The hot press for reprocessing a molded article into small tensile-test pieces, is carried out at a temperature of 220° C. or less within 5 minutes to obtain the molded article reprocessed.

In the case where a molded article having an arbitrary shape cannot be reprocessed into small tensile-test pieces depending upon e.g., the size and shape of the molded article, the molded article having an arbitrary shape may be directly used for measurement of tensile fracture stress and bending elastic modulus.

The tensile fracture stress of a molded article is measured by a tensile test performed in accordance with ISO527-1 at a tension rate of 5 mm/min.

The bending elastic modulus of a molded article is measured by a bending test performed in accordance with ISO178.

In the embodiment, the value of (tensile fracture stress−65) (MPa)/glass filler ratio (mass %) is 2.90 or more, preferably 2.95 or more, more preferably 3.00 or more and further preferably 3.05 or more.

The upper limit value of the value of (tensile fracture stress−65) (MPa)/glass filler ratio (mass %), which is not particularly limited, is preferably 4.00 or less and more preferably 3.75 or less.

The value of (tensile fracture stress−65) (MPa)/glass filler ratio (mass %) shows contribution of the glass filler (B) per unit blending ratio contained in a polyacetal resin composition to improvement of tensile fracture stress.

The value of (tensile fracture stress−65) (MPa)/glass filler ratio (mass %) being 2.90 or more means that, in FIG. 1 which is obtained by plotting the ratio of the glass filler on the abscissa axis and tensile fracture stress on the ordinate axis, the relationship between the glass filler ratio and tensile fracture stress of the polyacetal resin composition of the embodiment is expressed by the straight line (1) having an intercept 65 MPa and a slope of 2.90 or falls within the area above the line.

In the expression, 65 MPa is the value of tensile fracture stress of a polyacetal resin (A) with which the glass filler (B) is not blended. In the embodiment, the value of 65 MPa, which is the value of tensile fracture stress of a polyacetal resin (A) with which the glass filler (B) is not blended, rarely changes even if the molecular weight and structure of the polyacetal resin (A) vary.

In the art, the bending elastic modulus of a polyacetal resin molded article containing a glass filler was improved by increasing the content of a glass filler. In contrast, tensile fracture stress was unlikely to improve by adding a glass filler in an amount beyond about 30 mass % (FIG. 1, curve (3)). Because of this, it was difficult to obtain a molded article having a tensile fracture stress of 135 MPa or more. Although the reason for this is not clear, it is conceivable that adhesiveness of a polyacetal resin to a glass filler is poor and thus fracture may be developed from the interface between them when tensile stress is applied.

A conventional polyacetal resin molded article having low tensile fracture stress in contrast with bending elastic modulus had a problem of insufficient durability. In addition, in melt kneading of the polyacetal resin composition, deposition, crack of pellets and chips increase, with the result that it was difficult to obtain a molded article having good appearance. Likewise, there is a problem in manufacturing.

In the polyacetal resin composition of the embodiment, adhesion between a polyacetal resin and a glass filler can be dramatically enhanced. Because of this, even if the content of glass filler increases, the tensile fracture stress of a molded article goes up (FIG. 1, curve (2)) without reaching a plateau (FIG. 1, curve (3)). If the value of (tensile fracture stress−65) (MPa)/glass filler ratio (mass %) is a value of 2.90 or more, even if stress is repeatedly applied to a molded article, embrittlement of the molded article is suppressed and durability is drastically improved.

Surprisingly, the polyacetal resin composition having a value of (tensile fracture stress−65) (MPa)/glass filler ratio (mass %) of 2.90 or more produces deposition (resin and glass filler deposited around the dies) during melt-kneading of the polyacetal resin composition, but the amount of deposition is low and crack of pellets and the amount of chips also low. Owing to this, a molding cycle can be improved, leading to improvement in appearance of a molded article. In addition, an effect of improving the sliding property of the molded article can be obtained.

The ratio of a glass filler is the weight ratio of the glass filler (B) based on the polyacetal resin composition and expressed by "mass %".

The glass filler ratio is obtained by burning a polyacetal resin composition or a molded article at a sufficiently high temperature (400° C. or more) to remove a resin component, dividing the weight of the residue obtained by the weight of the polyacetal resin composition or molded article before burning and multiplying the product by 100.

In the embodiment, in order to obtain a molded article having a tensile fracture stress of 135 MPa or more, a bending elastic modulus of 7500 MPa or more, and a value of (tensile fracture stress−65) (MPa)/glass filler ratio (mass %) of 2.90 or more, for example, (A) using a block copolymer described later as the polyacetal resin and (B) using an acid-containing film-forming agent described later for the glass filler are mentioned.

In particular, if a block copolymer and an acid-containing film-forming agent are used in combination, interface adhesion between the polyacetal resin (A) and the glass filler (B) is dramatically improved and, particularly, tensile fracture stress and the value of (tensile fracture stress−65 MPa) (MPa)/glass filler ratio (mass %) increase.

When a polyacetal resin composition is produced by melt-kneading, it is effective to knead the glass filler (B) and the polyacetal resin (A) for a longer time in order to increase the value of (tensile fracture stress (MPa)−65 MPa)/glass filler ratio (mass %). It is generally considered that a glass filler is desirably kneaded for a time period as short as possible in melt-kneading of a resin composition; however, an opposite tendency is resulted in the embodiment.

More specifically, in order to increase the value of (tensile fracture stress−65 (MPa))/glass filler ratio (mass %), in supplying the glass filler (B) from a side feeder during extrusion kneading, the glass filler (B) may be supplied from a further upstream side.

The polyacetal resin composition of the embodiment is a polyacetal resin composition containing 100 parts by mass of a polyacetal resin (A) and 10 parts by mass or more and 100 parts by mass or less of a glass filler (B). In the composition, it is preferable that the tensile fracture stress according to ISO527-1 of a molded article obtained by molding the polyacetal resin composition is 135 MPa or more, the bending elastic modulus of the molded article according to ISO178 is 7500 MPa or more, and the value of (tensile fracture stress−65) (MPa)/glass filler ratio (mass %) is 2.90 or more; and further that when the molded article formed of the polyacetal resin composition is fractured by application of tensile force, the surface of the glass filler (B) protruding from a fracture surface of a fractured molded article is covered with a component containing the polyacetal resin (A) having an average thickness of 0.2 μm or more and 3.0 μm or less.

When a molded article formed of the polyacetal resin composition by molding is fractured by application of tensile force, the average thickness of a component containing a polyacetal composition covering the surface of the glass filler (B) protruding from a fracture surface of a fractured molded article is 0.2 μm or more and 3.0 μm or less.

If the average thickness is 0.2 μm or more, creep resistance and mechanical strength are improved. In addition, generation of chips is suppressed and the poor appearance of the molded article to be obtained can be suppressed, leading to quality improvement. In addition, since a molding cycle can be shortened, productivity is improved.

In contrast, if the average thickness is 3.0 μm or less, the flowability of the polyacetal resin composition can be suppressed from decreasing and the poor appearance of the molded article can be suppressed.

The lower limit value of the average thickness is preferably 0.3 μm and more preferably 0.4 μm.

The upper limit value of the average thickness is preferably 2.5 μm and more preferably 2.0 μm.

<Polyacetal Resin (A)>

A polyacetal resin (A) (hereinafter sometimes referred to as a component (A)) that can be used in the polyacetal resin composition of the embodiment will be more specifically described below.

Examples of the polyacetal resin (A) that can be used in the embodiment include a polyacetal homopolymer, a polyacetal copolymer, a polyacetal copolymer having a crosslinked structure, a block copolymer based on a block component-containing homopolymer and a block copolymer based on a block component-containing copolymer.

Polyacetal resins serving as the polyacetal resin (A) may be used singly or in combination of two or more.

As the polyacetal resin (A), e.g., a combination of polyacetal resins different in molecular weight and a combination of polyacetal copolymer different in the content of comonomers can be appropriately used.

In the embodiment, as the polyacetal resin (A), a block copolymer is preferably included.

Examples of the polyacetal resin (A) include a polyacetal homopolymer, which substantially consists of oxymethylene units alone, obtained by homopolymerization of a cyclic oligomer of formaldehyde, such as a formaldehyde monomer or a trimer (trioxane) or a tetramer (tetraoxane) thereof; and a polyacetal copolymer obtained by copolymerization of a cyclic oligomer of formaldehyde, such as a formaldehyde monomer or a trimer (trioxane) or a tetramer (tetraoxane) thereof and a cyclic ether or cyclic formal, such as ethylene oxide, propylene oxide, epichlorohydrin, or a cyclic formal of a glycol or a diglycol such as 1,3-dioxolane and 1,4-butanediol formal.

Examples of the polyacetal copolymer that can be used include a polyacetal copolymer having a branched chain obtained by copolymerization of a monomer of formaldehyde and/or a cyclic oligomer of formaldehyde and a mono-functional glycidyl ether; and a polyacetal copolymer having a crosslinked structure obtained by copolymerization of a monomer of formaldehyde and/or a cyclic oligomer of formaldehyde and a multifunctional glycidyl ether.

The polyacetal copolymer may be a block copolymer having a polyacetal repeating structural unit and a different block (unit).

In the embodiment, as the block copolymer, an acetal homopolymer or an acetal copolymer (hereinafter these will be sometimes collectively referred to as a block copolymer) having at least a block component represented by any one of the following formulas (1), (2) and (3) is preferable.

(1)

(2)

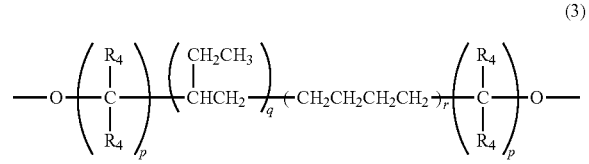

(3)

In the formulas (1) and (2), $R_1$ and $R_2$ each independently represent one selected from the group consisting of a hydrogen atom, an alkyl group, a substituted alkyl group, an aryl group and a substituted aryl group; and a plurality of $R_1$ and $R_2$ may be mutually the same or different;

$R_3$ represents one selected from the group consisting of an alkyl group, a substituted alkyl group, an aryl group and a substituted aryl group;

m represents an integer of 1 to 6 and preferably an integer of 1 to 4; and n represents an integer from 1 to 10000 and preferably an integer of 10 to 2500.

The block component represented by the above-mentioned formula (1) is a residue obtained by removing a hydrogen atom from an alkylene oxide adduct of an alcohol, and the block component represented by the above formula (2) is a residue obtained by removing a hydrogen atom from an alkylene oxide adduct of a carboxylic acid.

The polyacetal homopolymer having a block component represented by the formula (1) or (2) can be prepared by the method described, for example, in Japanese Patent Laid-Open No. 57-31918.

In the formula (3), $R_4$ represents one selected from the group consisting of a hydrogen atom, an alkyl group, a substituted alkyl group, an aryl group and a substituted aryl group; and a plurality of $R_4$ may be mutually the same or different;

p represents an integer of 2 to 6, two p may be mutually the same or different;

q and r each represent a positive number, assuming that the sum of q and r is 100 mol %, q represents 2 to 100 mol % and r represents 0 to 98 mol %; and —$(CH(CH_2CH_3)CH_2)$-unit and —$(CH_2CH_2CH_2CH_2)$-unit are present at random or as a block.

The block component represented by any one of the following formulas (1), (2) and (3) may be inserted into a polyacetal resin by reacting a compound constituting a block component having a functional group such as a hydroxyl group at both or one end, with the terminal portion of a polyacetal during polymerization of the polyacetal.

The insertion amount of a block component represented by the formula (1), (2) or (3) in a block copolymer, which is not particularly limited, is, for example, 0.001 mass % or more and 30 mass % or less based on the block copolymer as 100 mass %.

To prevent reduction of bending elastic modulus of a molded article, the insertion amount of the block component is preferably 30 mass % or less. In view of the tensile strength of a molded article, the insertion amount of the block component is preferably 0.001 mass % or more.

The lower limit value of the insertion amount of block component is more preferably 0.01 mass %, further preferably 0.1 mass % and further more preferably 1 mass %.

The upper limit value of the insertion amount of block component is more preferably 15 mass %, further preferably 10 mass % and further more preferably 8 mass %.

The molecular weight of a block component in a block copolymer is preferably 10000 or less in order to prevent a reduction of bending elastic modulus of a molded article, more preferably 8000 or less and further preferably 5000 or less.

The lower limit value of the molecular weight of the block component, which is not particularly limited, is preferably 100 or more in order to continuously maintain stable sliding property.

Examples of the compound forming a block component in a block copolymer include, but are not particularly limited to, $C_{18}H_{37}O$ $(CH_2CH_2O)_{40}C_{18}H_{37}$, $C_{11}H_{23}CO_2$ $(CH_2CH_2O)_{30}H$, $C_{18}H_{37}O(CH_2CH_2O)_{70}H$, $C_{18}H_{37}O(CH_2CH_2O)_{40}H$ and hydrogenated polybutadiene having two hydroxyalkylated ends.

The block copolymer is preferably an ABA-type block copolymer in view of coupling form.

The ABA-type block copolymer refers to a block copolymer having a block component represented by the formula (3), more specifically, a block copolymer constituted by coupling a polyacetal segment A (hereinafter referred to as A) and a hydrogenated polybutadiene segment B (hereinafter referred to as B) having two hydroxyalkylated ends, in the order of A-B-A.

The block component represented by the formula (1), (2) or (3) may have an unsaturated bond having an iodine value of 20 g-$I_2$/100 g or less. As the unsaturated bond, which is not particularly limited, a carbon-carbon double bond is mentioned.

As the polyacetal copolymer having a block component represented by the formula (1), (2) or (3), for example, a polyacetal block copolymer disclosed in International Publication No. WO 2001/09213 is mentioned and prepared in accordance with the method disclosed in the publication.

Using an ABA type block copolymer as the block copolymer tends to improve the adhesiveness to the surface of the glass filler (B). As a result, the tensile fracture stress and bending elastic modulus of a molded article can be likely increased.

The ratio of the block copolymer in the polyacetal resin (A) is preferably 5 mass % or more and 95 mass % or less based on the whole polyacetal resin (A) as 100 mass %.

The lower limit value of the ratio of the block copolymer is more preferably 10 mass %, further preferably 20 mass % and further more preferably 25 mass %.

The upper limit value of the ratio of the block copolymer is more preferably 90 mass %, further preferably 80 mass % and further more preferably 75 mass %.

The ratio of the block copolymer in the resin composition of the embodiment can be measured by e.g., $^1$H-NMR and $^{13}$C-NMR.

<Glass Filler (B)>

Examples of the glass filler (B) (hereinafter sometimes referred to as a component (B)) that can be used in the polyacetal resin composition of the embodiment include, are not particularly limited to, glass fibers, glass beads and glass flakes.

Examples of the glass fibers include a chopped strand glass fiber, a milled glass fiber and glass fiber roving. Of them, a chopped strand glass fiber is preferable in view of handling and mechanical strength of a molded article.

As the glass filler (B), glass fillers may be used alone or in combination of two or more.

The form the glass filler (B), such as particle size, fiber diameter and fiber length, is not particularly limited and any form of glass filler may be used; however, a glass filler (B) having a large surface area is preferable because the contact area with the polyacetal resin (A) is large, the creep resistance of the molded article is improved.

In the case of a chopped strand glass fiber, the average fiber diameter thereof is, for example, 7 μm or more and 15 μm or less.

If the average fiber diameter falls within the above range, the surface of the molded article becomes smooth, and a decrease in sliding property can be prevented. Furthermore, the creep resistance of the molded article can be enhanced; at the same time, the abrasion of the mold surface during molding can be prevented.

The lower limit value of the average fiber diameter is preferably 8 μm and more preferably 9 μm.

The upper limit value of the average fiber diameter is preferably 14 μm and more preferably 12 μm.

In the embodiment, the average fiber diameter can be easily obtained by burning a molded article at a sufficiently high temperature (400° C. or more) to remove a resin component, observing the resulting ash by a scanning electron microscope and measuring the diameter. To eliminate errors, diameters of at least 100 or more chopped strand glass fibers are measured to computationally obtain the average diameter of the fiber.

As the glass fiber, two types or more glass fibers different in diameter may be used in combination.

As the glass filler (B), a glass filler, the surface of which is treated with a film-forming agent and modified, is preferable. The film-forming agent is sometimes referred to as a converging agent.

Examples of the film-forming agent include a urethane resin, an epoxy resin, a copolymer resin having at least one acid component. Of them, a film-forming agent containing a copolymer resin having at least one acid component is preferable.

Examples of the copolymer resin having at least one acid component include a copolymer containing a carboxylic acid-containing unsaturated vinyl monomer and an unsaturated vinyl monomer except the carboxylic acid-containing unsaturated vinyl monomer as constitution units; and a copolymer containing a carboxylic anhydride-containing unsaturated vinyl monomer and an unsaturated vinyl monomer except the carboxylic anhydride-containing unsaturated vinyl monomer, as constitution units. Of them, a copolymer containing a carboxylic acid-containing unsaturated vinyl monomer and an unsaturated vinyl monomer except the carboxylic acid-containing unsaturated vinyl monomer as constitution units, is more preferable.

The film-forming agents may be used alone or in combination of two or more.

Examples of the carboxylic acid-containing unsaturated vinyl monomer include acrylic acid, methacrylic acid, fumaric acid, itaconic acid and maleic acid, and acrylic acid is preferable.

The carboxylic acid-containing unsaturated vinyl monomers may be used alone or in combination of two or more.

As the carboxylic anhydride-containing unsaturated vinyl monomer, e.g., an anhydride such as maleic acid or itaconic acid is mentioned.

The carboxylic anhydride-containing unsaturated vinyl monomers may be used alone or in combination of two or more.

If the surface of the glass filler (B) is modified with a film-forming agent, the adhesion strength of the interface between the glass filler and the polyacetal resin (A) can be enhanced and the average thickness of the layer covering the surface of the glass filler is increased. Owing to this, creep resistance and tensile fracture stress are improved. In addition, wearing at the time of sliding can be suppressed.

In particular, if a polyacetal resin containing a block component and a glass filler modified with a film-forming agent are used in combination, creep resistance and tensile fracture stress are drastically improved.

In the embodiment, the surface of the glass filler (B) may be modified with a coupling agent.

The coupling agent is not particularly limited and a known coupling agent can be used.

Examples of the coupling agent include an organic silane compound, an organic titanate compound and an organic aluminate compound.

The coupling agents may be used alone or in combination of two or more.

Examples of the organic silane compound include vinyltriethoxysilane, vinyl-tris-(2-methoxyethoxy)silane, γ-methacryloxypropylmethoxysilane, γ-aminopropyltrimethoxysilane, γ-aminopropyltriethoxysilane, N-β-(aminoethyl)-γ-aminopropyltrimethoxysilane, β-(3,4-epoxycyclohexyl)ethyltriethoxysilane, γ-glycidoxypropyltrimethoxysilane and γ-mercaptopropyltrimethoxysilane.

Of them, vinyltriethoxysilane, vinyl-tris-(2-methoxyethoxy)silane, γ-methacryloxypropylmethoxysilane, γ-aminopropyltrimethoxysilane, γ-aminopropyltriethoxysilane and γ-glycidoxypropylmethoxysilane are preferable. Vinyltriethoxysilane, γ-glycidoxypropyltrimethoxysilane and γ-aminopropyltriethoxysilane are more preferable in view of economy and thermal stability of the resin composition.

Examples of the organic titanate compound include tetra-i-propyl titanate, tetra-n-butyl titanate, a butyl titanate dimer, tetrastearyl titanate, triethanolamine titanate, titanium acetylacetonate, titanium lactate, octylglycol titanate and isopropyl(N-aminoethylaminoethyl) titanate.

Examples of the organic aluminate compound include acetoalkoxyaluminum diisopropylate.

If a glass filler the surface of which is treated with a coupling agent is used, the creep resistance of a molded article tends to be more improved; at the same time, the thermal stability of the molded article tends to be more improved.

<Polyethylene Resin (C) Having a Weight-Average Molecular Weight of 500,000 or Less>

In the resin composition of the embodiment, a polyethylene resin (C) having a weight-average molecular weight of 500,000 or less (hereinafter sometimes referred to as a polyethylene resin (C) or a component (C)) is preferably contained.

As the polyethylene resin (C), polyethylene resins may be used alone or in combination of two or more.

If the weight-average molecular weight is 500,000 or less, the generation of chips can be suppressed; at the same time, coefficient of friction in sliding between a molded article and a metal is low and very stable.

(C) The weight-average molecular weight of a polyethylene resin is preferably 10,000 or more and 400,000 or less, more preferably 15,000 or more and 300,000 or less, further preferably 20,000 or more and 200,000 or less and further more preferably 30,000 or more and 150,000 or less.

The weight-average molecular weight can be measured by the following method. A sample or molded article of a polyacetal resin composition is partly cut out and soaked in hexafluoroisopropanol (hereinafter abbreviated to HFIP) and dissolved. The polyacetal resin component dissolved is filtered off. Note that, when the polyacetal resin component is not dissolved in HFIP, the polyacetal resin component may be removed by decomposition with hydrochloric acid and the like.

Next, the unmolten residual component was dissolved in trichlorobenzene (hereinafter abbreviated to TCB) at 140° C. and filtered. In this manner, a glass filler is filtered off. The resultant filtrate is subjected to measurement by gel permeation chromatography (hereinafter abbreviated to GPC). As the column, a single column UT-807 (manufactured by Showa Denko K.K.) and two columns GMHHR-H (S) HT (manufactured by Tohso Corporation)

are connected in series and put in use. As the mobile phase, TCB is used. A sample is used in a concentration of 20 to 30 mg (polyethylene resin)/20 mL (TCB). Measurement is carried out by setting the temperature of the columns at 140° C. and the flow rate at 1.0 mL/minute, and using a differential refractometer as a detector.

The weight-average molecular weight is calculated with polymethylmethacrylate (hereinafter abbreviated to PMMA) used as a standard substance. The PMMA standard substance to be used herein is PMMA having a number average molecular weight within the range of about 2,000 to 1,000,000, and at least 4 samples are used.

The content of the polyethylene resin (C) based on the polyacetal resin (A) (100 parts by mass) is preferably 0.5 parts by mass or more and 8 parts by mass or less, more preferably 1 part by mass or more and 6 parts by mass or less and further preferably 1.5 parts by mass or more and 5 parts by mass or less.

If the content is 0.5 parts by mass or more, sliding property is satisfactory and stable for a long period of time. In addition, wear resistance is improved.

If the content is 8 parts by mass or less, reduction in mechanical strength, chips of a resin composition during melt-kneading and peeling of a molded article (removal of a polyethylene resin component (C)) can be suppressed.

The content of the polyethylene resin (C) can be checked, for example, by the following method. A polyacetal resin composition or a molded article is burned at a sufficiently high temperature (400° C. or more) to remove a resin component. The weight of the resulting ash is measured to obtain the content of the glass fiber (B).

Next, the polyacetal resin contained in a polyacetal resin composition or a molded article is decomposed with hydrochloric acid. From the residue, the blending ratio of the glass fiber (B) is subtracted to obtain the content of the polyethylene resin (C). Note that, depending upon the situation, the presence or absence of other components is checked by e.g., IR, and an additional removal operation may be carried out.

Examples of the polyethylene resin (C) to be used in the embodiment include a very low-density polyethylene, a low-density polyethylene, a high density polyethylene and a straight-chain low density polyethylene. Furthermore, an ethylene copolymer and the like containing 5 mass % or less of a comonomer such as propylene, butene, and octene may be used.

Of them, a low-density polyethylene is preferable in view of the coefficient of friction in sliding on a metal.

As the polyethylene resin (C) that can be used in the embodiment, at least one polyethylene resin having a melting point (hereinafter abbreviated to Tm) of 115° C. or less is preferably contained. Tm is more preferably 110° C. or less.

If Tm is 115° C. or less, the friction coefficient in sliding on a metal is low and very stable molded article is obtained. In addition, in producing a polyacetal resin composition by melt-kneading, the torque of the extruder used in the operation can be efficiently and significantly reduced. Owing to this, an increase of the discharge amount, which was difficult for a conventional composite of a polyacetal resin and a glass filler, can be attained.

In the embodiment, as Tm, an endothermic peak value, which is obtained by subjecting a sample of a polyacetal resin composition or a piece (4 to 6 mg) cut out (preferably pressed into a slice) from a molded article, to differential scanning calorimetry (DSC) performed at a temperature increase rate of 10° C./min, is used.

<Stabilizer>

A molded article of the polyacetal resin composition of the embodiment may contain various types of stabilizers usually used in a polyacetal resin composition as long as the object of the present invention can be attained.

Examples of the stabilizer include, but are not particularly limited to, an antioxidant, and a scavenger for formaldehyde and formic acid and the like.

The stabilizers may be used alone or in combination of two or more.

As the antioxidant, a hindered phenol antioxidant is preferable in view of improvement of thermal stability of a molded article. As the hindered phenol antioxidant, which is not particularly limited, a hindered phenol antioxidant known in the art can be appropriately used.

The addition amount of the antioxidant based on 100 parts by mass of the polyacetal resin (A) is preferably 0.1 part by mass or more and 2 parts by mass or less.

Examples of the scavenger for formaldehyde and formic acid include a compound containing formaldehyde-reactive nitrogen such as melamine and a polyamide resin and the like and a polymer thereof; and a hydroxide, an inorganic acid salt, and a carboxylic acid salt of an alkali metal or an alkaline earth metal.

Specific examples thereof include calcium hydroxide, calcium carbonate, calcium phosphate, calcium silicate, calcium borate and fatty acid calcium salts (calcium stearate, calcium myristate). These fatty acids may be substituted with a hydroxyl group.

The addition amount of the scavenger based on 100 parts by mass of the polyacetal resin (A) is as follows: in the case of a polymer containing formaldehyde-reactive nitrogen, serving as a scavenger for formaldehyde and formic acid, the addition amount thereof is preferably 0.1 part by mass or more and 3 parts by mass or less; and in the case of the fatty acid salt of an alkaline earth metal, the addition amount thereof preferably falls within the range of 0.1 part by mass or more and 1 part by mass or less.

<Other Components>

The molded article of a polyacetal resin in the embodiment may contain components known in the art and used in conventional polyacetal resin compositions as long as the object of the present invention can be attained. Specific examples thereof include a filler other than the glass filler (e.g., talc, wollastonite, mica, calcium carbonate), a conductive agent (e.g., carbon black, graphite, carbon nanotubes), a colorant (e.g., titanium oxide, zinc oxide, iron oxide, aluminum oxide, organic dyes), a sliding property imparting agent (e.g., various ester compounds, metal salts of organic acids), a stabilizer such as an ultraviolet absorber, a light stabilizer and a lubricant.

The addition amounts of the other components are follows: The addition amount of each of the filler except a glass fiber, conductive agent and colorant based on 100 mass % of the polyacetal resin is preferably 30 mass % or less; the addition amount of each of the sliding property imparting agent, ultraviolet absorber, light stabilizer and lubricant based on 100 mass % of the polyacetal resin is preferably 5 mass % or less.

The other components may be used alone or in combination of two or more.

<Method for Producing the Molded Article>

The molded article of the embodiment can be produced by a method known in the art; more specifically, produced by mixing and melt-kneading the raw material components by a single or multi-screw kneading extruder, a roll or a Banbury mixer and the like, and molding into a shape. Of them, a twin-screw extruder equipped with a pressure reducing device and side feeder is preferably used.

As a method for mixing and melt-kneading the raw material components, which is not particularly limited, a method known to those skilled in the art can be used. Specific examples thereof include a method involving mixing a component (A) and a component (B) in advance by a super mixer, a tumbler or a v-shaped blender and the like and subjecting the mixture to simultaneous melt-kneading by a twin-screw extruder; and a method involving supplying a component (A) to a twin-screw extruder through the main throat portion and melt-kneading, and adding a component (B) through the mid-portion of the extruder during the melt-kneading. Both methods may be used; however, in order to improve the mechanical properties of the molded article of the embodiment, the method involving supplying a component (A) to a twin-screw extruder through the main throat portion and melt-kneading, and adding a component (B) through the mid-portion of the extruder during the melt-kneading is preferable. Since optimal conditions vary depending upon the size of the extruder, it is preferable that the conditions are appropriately controlled within the range available by those skilled in the art. More preferably, the screw of the extruder is variously designed within the range available by those skilled in the art.

When a component (C) is blended, the component (C) can be added from a mid-portion of the extruder; however, it is preferably supplied through the main throat portion. In such a process, it was surprisingly found that the effect of greatly reducing the torque of the extruder can be obtained. Likewise, the productivity can be greatly improved.

In the embodiment, as a method for obtaining a molded article, which is not particularly limited, a molding method known in the art can be used. Specifically, molding can be made by any one of the molding methods including extrusion molding, injection molding, vacuum molding, blow molding, injection compression molding, decorative molding, different-material molding, gas assist injection molding, foam injection molding, low pressure molding, ultra-thin wall injection molding (ultra-high speed injection molding) and an in-mold composite molding (insert molding, outsert molding).

<Amount of Polyethylene Resin (C) in the Surface Layer of Molded Article>

In the molded article of the embodiment, the amount of polyethylene resin (C) having a weight-average molecular weight of 500,000 or less present in the surface layer of the molded article is preferably larger than the amount of polyethylene resin (C) having a weight-average molecular weight of 500,000 or less in the layer surface deeper than 1,000 μm from the surface layer of the molded article measured by excising out the layer.

The amount of polyethylene resin (C) is computationally obtained from relative elemental concentration (atomic %) of carbon C measured by X-RAY photoelectron spectroscopy (XPS). As a measuring device, for example, ESCALAB250 and the like manufactured by Fisher Scientific may be mentioned.

As the excitation source for measurement, e.g., monoAlKα is used. To remove the influence of contaminants attached to the surface of a molded article, the surface of the molded article is ultrasonically washed with a cleaner (for example, aqueous solution of VALTRON DP97031), rinsed with pure water and dried in e.g., an oven. The take-off angle of photoelectrons is set at 0° (perpendicular to the molded article). In the capture area, Surbey Scan is carried out at 0 to 1100 eV, and Narrow Scan is targeted to a carbon C (1s) region. Furthermore, in Pass Energy at Survey scan is 100 eV and that of Narrow scan is 20 eV. In XPS measurement, Binding Energy of 286 to 288 eV represents carbon derived from a polyacetal resin and Binding Energy of 284 to 286 eV represents carbon derived from the olefin such as polyethylene. If the peaks can be separated, only carbon derived from polyethylene is used. If the peaks cannot be separated, the peak area within the range of 284 to 288 eV may be used.

Assuming that the carbon concentration in the surface layer of a molded article is represented by $C_1$ and the carbon concentration in the layer surface of the molded article deeper than 1,000 μm and measured by excising the molded article and taking out the center, is represented by $C_2$, if the relationship represented by the expression: $[C_1]/[C_2]>1$ is established, it can be said that the amount of polyethylene resin (C) having a weight-average molecular weight of 500,000 or less) present in the surface layer of the molded article is larger than the amount of polyethylene resin (C) having a weight-average molecular weight of 500,000 or less in the layer surface (measured by excising it out) deeper than 1,000 μm from the surface layer of the molded article.

Note that, in the embodiment, as the site at which $C_2$ is to be measured, a site deeper than 1,000 μm is defined; however, in the molded article obtained by molding the polyacetal resin composition of the embodiment, as long as a site is present at a level deeper than 100 μm from the surface layer thereof, the amount of polyethylene resin (C) present at the site is almost the equal to the starting amount thereof.

It is preferable that $1.01 [C_1]/[C_2] \leq 1.20$, more preferable that $1.02 [C_1]/[C_2] \leq 1.18$ and further preferable that $1.05 [C_1]/[C_2] \leq 1.15$.

Note that, if a block copolymer having a block component represented by the above formula (3) is used as the polyacetal resin, the carbon concentration of the polyacetal resin, itself increases. However, since the concentration of carbon derived from a polyacetal resin in the surface layer does not differ from that at the site deeper than 1,000 μm, if the above expression is established, it can be said that a larger amount of polyethylene resin (C) is present in the surface layer.

Since a polyethylene resin (C) is present in a larger amount in the surface layer of the molded article than in a site deeper than 1,000 μm, the sliding property at the initiation time of sliding is improved. Furthermore since the effect on a sliding property can be dramatically improved by adding a small amount of polyethylene, reduction of mechanical strength such as bending elastic modulus can be suppressed. Moreover, an extraordinary effect of suppressing the amount of chips during melt-kneading of a resin composition can be obtained.

Note that, in the case of a molded article having a thickness of less than 2,000 μm, the carbon concentration of the molded article at the center in the depth direction can be used in place of the carbon concentration of a layer deeper than 1,000 μm, To attain the amount of the polyethylene resin (C) in the surface layer of a molded article to be larger than that in a layer deeper than 1,000 μm, the weight-average molecular weight of the polyethylene resin (C) to be blended is controlled to fall within the range of a 500,000 or less. Furthermore, the amount of the polyethylene resin (C) in the surface layer of a molded article is controlled to be present in a larger amount than a layer deeper than 1,000 μm by setting Tm of the polyethylene resin (C) to be 115° C. or less.

[Use]

The polyacetal resin composition of the embodiment can be used as a raw material for a molded article requiring durability, mechanical strength and wear resistance.

The molded article of the embodiment can be suitably used as automotive parts, in particular, suitably used as parts playing a role of a gear and a pulley in contact with other members.

Other than these, the molded article can be applied to uses known as the uses of a polyacetal resin in the art. Examples thereof include machinery parts such as cams, sliders, levers, arms, clutches, felt clutches, idler gears, rollers, key stems, key tops, shutters, reels, shafts, joints, shafts, bearings, door rollers and guides; resin parts of outsert molding, resin parts of insert molding, chassis, tray, side plate, auto parts; door associated parts such as door locks, door handles, window regulators, window regulator wire drums, speaker grills and glass holders; seat belt associated parts such as slip rings for seat belts, and press buttons; parts such as combination switch parts, switches, clips; fuel associated parts such as gasoline tanks, fuel pump modules, valves, and gasoline tank flanges; parts for office automation equipment such as printers and copiers; parts for video equipment such as digital video cameras and digital cameras; CD, DVD, Blu-ray Disc, other optical disc drives; music, video or information devices such as navigation systems and mobile personal computers; parts for communication equipment such as mobile phones and facsimiles; parts for electrical equipment; and parts for electronics. Examples of other uses include nibs of the writing instruments, and parts of machinery of pushing in and out lead; wash basins, drain outlets, drain plug open-shut machinery parts; code stoppers for clothing, adjusters and buttons; watering nozzle, watering hose connection joints; stair handrail parts, and building supplies such as support tools for floor materials; toys, fasteners, chains, conveyors, buckles, sports equipment, vending machines (open-shut locking mechanism, commodity discharge machinery parts), furniture, musical instruments, and household equipment parts.

EXAMPLES

The embodiment will be more specifically described by way of Examples and Comparative Example; however, the embodiment is not limited by these Examples and Comparative Examples as long as it is not outside the scope.

Production conditions and evaluation items of polyacetal resin compositions and molded articles used in Examples and Comparative Examples are as follows.

(1) Extrusion

A co-rotating twin-screw extruder (TEM-48SS extruder manufactured by TOSHIBA MACHINE CO., LTD) having a ratio of screw length L to screw diameter D (L/D ratio) of 48 (the number of barrels 12); side feeders at a sixth barrel and an eighth barrel and a vacuum vent at an eleventh barrel, was used. The first barrel was cooled with water; the temperatures of second to fifth barrels were set at 210° C.; and the temperatures of sixth to twelfth barrels were set at 180° C.

The screw used for extrusion were designed as follows. Flight screws (hereinafter, abbreviated to FS) were arranged at the first to fourth barrels. At the fifth barrel, two kneading discs (hereinafter abbreviated to RKD) having a feed function; two kneading discs (hereinafter abbreviated to NKD) having no feed function; and a single kneading disc (hereinafter abbreviated to LKD) having a feed function in the reverse direction were arranged in this order. FS was arranged at the sixth to eighth barrels; a single RKD and a single NKD were arranged in this order at the ninth barrel; and FS was arranged at 10th to 11th barrels.

(Process 1)

A glass filler was supplied from the side feeder at the sixth barrel and extrusion was performed at a screw rotation speed of 150 rpm and a total extrusion amount of 70 kg/h.

(Process 2)

A glass filler was supplied from a side feeder at the eighth barrel and extrusion was performed at a screw rotation speed of 150 rpm and a total extrusion amount of 70 kg/h.

(2) Extrusion Productivity

The torque at the time of the extrusion was used for evaluation of extrusion productivity.

As the numerical value of torque becomes smaller, the extrusion was easily made and the discharge speed can be sufficiently increased; and extrusion productivity is determined to be high.

(3) Deposition Amount

Substances deposited near the dice during extrusion were collected and quantified per unit time.

As the deposition amount is lower, the productivity and quality are more favorable.

(4) Amount of Chips

After the extrusion mentioned above, a strand of 80° C. was loaded in a strand cutter having a clearance of 7/1000 and pelletized. The pellets were not passed through a pellet sorting machine.

The resultant pellets of 1 kg±0.1 kg were passed through a 14-mesh sieve in three divided doses. The weight of pellets passed through the mesh is divided by the weight of initial pellets subjected to sieving to obtain the amount of chips. The smaller the value, the smaller the amount of chips and the better the quality.

(5) Small Tensile-Test Pieces of a Molded Article

Molding is carried out by using an injection molding machine (EC-75NII, manufactured by TOSHIBA MACHINE CO., LTD) in injection conditions: a cylinder temperature of 205° C., injection time of 35 seconds and cooling time of 15 seconds, to obtain small tensile-test pieces of a molded article according to ISO294-2. The temperature of a mold was set at 90° C. and the small test-pieces of a molded article according to ISO294-2 were used the following individual measurements (6) to (8), (10), (12) and (14).

As the test pieces for creep resistance test to be used in measurement of the creep rupture time (9) below, small tensile-test pieces of a molded article according to JIS K7139-5A were obtained. The temperature of a mold was set at 90° C.

(6) Tensile Fracture Stress

Using the molded article obtained in the above section (5), a tensile test was performed in accordance with ISO527-1 and at a tension rate of 5 mm/min, and then, tensile fracture stress was measured.

(7) Bending Elastic Modulus

Using the molded article obtained in the above section (5), a bending test was performed in accordance with ISO178, and bending elastic modulus was measured.

(8) Average Thickness of a Component Covering the Surface of the Glass Filler

The molded article obtained in the above section (5) was fractured in a tensile test at a tension rate 50 mm/min. To the fracture surface of the molded article, platinum was deposited to prepare observation test pieces. The observation test pieces were subjected to measurement under a scanning electron microscope (SEM). The (observation) magnification was 5,000×.

Control was made so as to observe the centers of fracture surface of observation test pieces as an observation site. From glass fibers protruding from the fracture surface, 50 glass fibers were arbitrarily selected. It was confirmed that the surfaces of the all glass fibers having a circular cross-section were each covered with a resin component. Next, the diameters of the glass fibers covered with the resin component were measured. Separately, the test pieces were burned at 450° C. for 3 hours to remove the resin component, and then, the average diameter of 100 glass fibers was previously obtained. Based on the difference in diameter between both cases, the thickness of the resin component deposited to the surface was obtained. The thickness values of 50 glass fibers were arithmetically averaged and regarded as an average thickness of the component covering the surface of the glass filler.

(9) Creep Rupture Time

The creep resistance test pieces of a molded article obtained in the above section (5) were subjected to a creep test using a creep tester (manufactured by TOYO SEIKI SEISAKU-SHO, LTD.) in the environment of 80° C. and at a load of 25 MPa. The time until the test pieces were broken was measured. Measurement was performed three times and the average of them was regarded as creep rupture time. The larger the numerical value, the more excellent the creep resistance.

(10) Wear Resistance (Depth of Wear) Against SUS304 Ball and Dynamic Friction Coefficient Against SUS304 Ball The molded article obtained in the above section (5) was subjected to a ball-on-disc reciprocating frictional abrasion tester (Type AFT-15MS, manufactured by Toyo Seimitsu). A sliding test was performed under the environment of 23° C. and a humidity of 50% in the conditions: a load of 19.6 N, a linear velocity of 30 mm/sec, a reciprocation distance of 20 mm and a reciprocation number of 5,000. As the ball, SUS304 ball (having a diameter of 5 mm) was used. The wear volume of the sample (depth of wear) after the sliding test was measured by a confocal microscope (OPTELICS (registered trademark) H1200, manufactured by Lasertec Corporation). The measurement values (n=5) were averaged and specified as the depth of wear by SUS304 ball. The lower the numeric value, the more excellent the wear resistance.

In the sliding test, the dynamic friction coefficient at the time when sliding was performed 1000 times was specified as dynamic friction coefficient (initial sliding property) against SUS304 ball, the dynamic friction coefficient at the time when sliding was performed 5,000 times was specified as the dynamic friction coefficient of a molded article against SUS304 ball. The lower the numeric value, the more excellent the sliding property.

(11) Dynamic friction coefficient against SS400 flat plate

A resin pin having a round tip of 5 mm was manufactured by molding by use of an injection molding machine (Ti30G2, manufactured by Toyo Machinery & Metal Co., Ltd.) in injection conditions: a mold temperature of 90° C., a cylinder temperature of 200° C., an injection speed of 40% and injection time for 3 seconds.

A ball-on-disc reciprocating dynamic frictional abrasion tester (Type AFT-15MS, manufactured by Toyo Seimitsu) was used. Evaluation was performed in the environment of 23° C. and a humidity of 50% and in the conditions: a load of 39.2 N, a linear velocity of 30 mm/sec, a reciprocation distance of 20 mm and reciprocation times of 10,000, by using SS400 flat metal plate as a disc and a resin pin having a round tip of 5 mm in diameter as a ball. The dynamic friction coefficient at the time when sliding was performed 10,000 times was specified as the dynamic friction coefficient of the molded article against SS400 flat plate. The lower the numeric value, the more excellent the sliding property.

(12) Dynamic Friction Coefficient Between the Same Materials

The ball-on-disc reciprocating dynamic frictional abrasion tester (Type AFT-15MS, manufactured by Toyo Seimitsu) was used. Evaluation was performed in the environment of 23° C. and a humidity of 50% and in the conditions: a load of 19.6 N, a linear velocity of 30 mm/sec, a reciprocation distance of 20 mm and reciprocation times of 5,000, by using the molded article obtained in the above section (5) as a disc and a resin pin having a round tip of 5 mm in diameter obtained in the above section (11) as a ball. The dynamic friction coefficient at the time when sliding was performed 5,000 times was specified as the dynamic friction coefficient of the same molded article materials. The lower the numeric value, the more excellent the sliding property.

(13) Molding Cycle

A spur gear (single) having a module of 0.8, teeth number of 50 and a tooth width of 5 mm was molded by using an injection molding machine (α50i-A, manufactured by FANUC CORPORATION) by setting the cylinder temperature at 190° C., the mold temperature at 80° C. and the injection pressure at 120 MPa. At this time, the injection time was set at 5 seconds and the cool time was set at 15 seconds as a minimum. If the time required for measuring the amount of resin exceeded 15 seconds, the screw rotation speed was increased to shorten the measurement time. If the measurement time exceeded 15 seconds even if the screw rotation speed was increased during measurement time, cooling time was set at measurement time+3 seconds. Under the conditions, continuous molding was carried out for 20 minutes.

In this test, the length of the cooling time per sample and the number of gears molded during continuous molding per 20 minutes were measured and used as evaluation criteria for molding productivity. At this time, if the measurement time is long (in some cases, cool time is also long), the time required for one shot becomes long, with the result that the molding cycle becomes long and productivity decreases.

(14) Ratio of Polyethylene Resin (Surface Polyethylene Ratio) Present in Surface Layer of the Molded Article An X-ray photoelectron spectroscope (XPS) ESCALAB250, manufactured by Thermo Fisher Scientific Inc., was used and monoALKα (15 kV×10 mA) was used as an excitation source. An area size of 1 mm squares was used for analysis. Deposited substances on the surface layer of a molded article was removed as follows. After the organic substances of the surface was removed with a 1.5% aqueous solution of a commercially available precision equipment cleaning agent (VALTRON DP97031) by ultrasonic cleaning in the condition of 50° C. for 3 minutes, an ultrasonic treatment with distilled water for high performance liquid chromatography was performed at room temperature for 15 minutes for washing. Subsequently, the sample ultrasonically washed was dried in a dry oven of 80° C. for one hour and then subjected to measurement. In the measurement, the take-off angle of photoelectrons was set at 0° (perpendicular to the molded article). In the capture area, Surbey Scan is carried out at 0 to 1100 eV, and Narrow Scan is targeted to a carbon C (1s) region. Furthermore, in Pass Energy at Survey scan is 100 eV and that of Narrow scan is 20 eV. At this time, the C concentration was obtained from the peak area ratio in the range of 284 eV to 288 eV. The relative elemental concentration was calculated from the area ratio and rounded. If the concentration is 1 atomic % or more, calculation was performed with significant two-digit accuracy; whereas, the concentration is less than 1 atomic %, calculation was performed with a significant-digit accuracy. As the measurement sample, the molded article obtained in the above section (5) was used. The carbon concentration in the surface layer of the molded article was expressed by $[C_1]$. Subsequently, the center of the molded article in the thickness direction was cut out by a microtome and the carbon concentration of this portion was measured in the same manner and specified as the carbon concentration $[C_2]$ near the center in the thickness direction.

(15) Cantilever Bending Vibration Fatigue

Test pieces were prepared by molding a flat plate of 12 cm in length×8 cm in width×0.3 cm in thickness by using an injection molding machine (EC-75NII, manufactured by TOSHIBA MACHINE CO., LTD) in the conditions: the cylinder temperature of 200° C. and a mold temperature of 80° C. and cool time of 10 seconds; and cutting the flat plate into test pieces in accordance with ASTM D671 TYPE1 such that the direction parallel to the resin supply direction during molding became the direction of measurement. The test pieces were subjected to measurement performed by a repeat vibration fatigue tester manufactured by TOYO SEIKI KOGYO CO. LTD. in accordance with the method according to ASTM D671-B at a repeat number of 1800 times/min and a temperature of 23° C. The stress (kg f/m²) at the time when a test piece was fractured at the repeat number of $10^6$ in the bending test or at the time when the maximum deflection of a test piece exceeds the value before fracture±8 mm was specified as the value of the cantilever bending vibration fatigue. From a graph obtained by plotting at least 5 points of about $10^4$ to $10^7$ repeat times, a value of $10^6$ repeat times was read out. The larger the value, the more excellent the durability.

(16) SFD (Spiral Flow Distance)

SFD of each composition at an injection pressure of 80 MPa was evaluated by using an injection molding machine (ROBOSHOT α-50iA, manufactured by FANUC CORPORATION) in the conditions: a cylinder temperature of 200° C., a mold temperature of 80° C., and using an SFD mold of 2 mm in thickness. The longer the SFD, the more excellent the flowability.

The raw material components for polyacetal resin compositions and molded articles used in Examples and Comparative Examples will be described below.

(A1) Product name: TENAC (registered trademark)-C 4520 (manufactured by Asahi Kasei Chemicals Corporation), melt flow rate (MFR)=9.0 g/10 minutes, number average molecular weight Mn=about 70,000

(A2) Product name: TENAC (registered trademark)-C 7520 (manufactured by Asahi Kasei Chemicals Corporation), Melt flow rate (MFR)=45.0 g/10 minutes, number average molecular weight Mn=25,000

(A3) A polyacetal block copolymer was prepared as follows. A double-screw paddle continuous polymerizer equipped with a jacket through which a heat medium can be passed was used by controlling the temperature thereof at 80° C. Polymerization was performed continuously supplying trioxane at a rate of 40 moles/hour, 1,3-dioxolane at a cyclic formal at a rate of 2 moles/hour, boron trifluoride di-n-butyl etherate dissolved in cyclohexane as a polymerization catalyst in an amount of $5 \times 10^{-5}$ moles per 1 mole of trioxane and hydrogenated polybutadiene (number average molecular weight Mn=2,330) having a hydroxyl group at both ends represented by the following formula (5) in an amount of $1 \times 10^{-3}$ moles per 1 mole of trioxane as a chain transfer agent, to the above polymerizer.

(4)

Next, the polymer discharged from the polymerizer was put in a 1% aqueous triethylamine solution. After the polymerization catalyst was completely deactivated, the polymer was filtered and washed to obtain a crude polyacetal block copolymer.

To 100 parts by mass of the resultant crude polyacetal block copolymer, 1 part by mass of an aqueous solution containing a quaternary ammonium compound (described in Japanese Patent No. 3087912) was added and uniformly mixed. The addition amount of the quaternary ammonium compound was 20 ppm by mass in terms of nitrogen equivalent. The mixture was supplied to a double-screw extruder with a vent and 0.5 parts by mass of water was added to 100 parts by mass of the polyacetal block copolymer molten in the extruder. Unstable terminal portions of the polyacetal block copolymer were decomposed away by setting the temperature of the extruder to be 200° C. and the retention time in the extruder to be 7 minutes.

To the polyacetal block copolymers from which unstable terminal portions were decomposed away, 0.3 parts by mass of triethylene glycol-bis-[3-(3-t-butyl-5-methyl-4-hydroxyphenyl)-propionate] was added as an antioxidant. While removing a solvent from an extruder with a vent at a vacuum degree of 20 Torrs, a strand was extruded from dies portion of the extruder and pelletized.

The polyacetal block copolymer thus obtained was designated as polyacetal block copolymer (A3). The block copolymer is an ABA type block copolymer and the melt flow rate thereof was 15 g/10 minutes (ISO-1133, condition D). The number average molecular weight Mn computationally obtained from the melt flow rate was about 50,000.

As the glass filler (B), the following fillers were used.

(B1) Glass fiber treated with e.g., a film-forming agent described in Japanese Patent No. 4060831, in Production Example 1 (containing a copolymer containing acrylic acid and methyl acrylate).

(B2) Glass fiber treated with a film-forming agent (containing a copolymer containing acrylic acid) described in Japanese Patent Laid-Open No. 2012-136385, Example 1.

(B3) Glass fiber treated with a film-forming agent (containing no acid) described in Japanese Patent Laid-Open No. 2009-7179, Sample No. 1.

As the polyethylene resin (C), the following resins are used.

(C1) SUNTEC (registered trademark) LD L1850A, manufactured by Asahi Kasei Chemicals Corporation weight-average molecular weight: 132,000, Tm=107° C., density: 918 kg/m³

(C2) SUNTEC (registered trademark) HD J240, manufactured by Asahi Kasei Chemicals Corporation, weight-average molecular weight: 73,000, Tm=127° C., density: 966 kg/m³

(C3) Sunfine (registered trademark) BM840, manufactured by Asahi Kasei Chemicals Corporation weight-average molecular weight: 324,000, Tm=126° C., density: 931 kg/m³

(C4) Sunfine (registered trademark) UH901, manufactured by Asahi Kasei Chemicals Corporation
molecular weight (viscosity method): 3,300,000, Tm=136° C., density: 940 kg/m³

Weight-average molecular weights were each measured by dissolving a polyethylene resin (C) in TCB at 140° C. and subjecting the obtained solution to GPC as follows. As the columns, UT-807 (single column) manufactured by Showa Denko K.K., and GMHHR-H (S) HT (two columns) manufactured by Tohso Corporation were used and connected in series. TCB was used as the mobile phase and the sample concentration was 20 to 30 mg ((C) polyethylene resin)/20 mL (TCB). Measurement was performed at a column temperature of 140° C., a flow rate of 1.0 ml/minute and using a differential refractometer as a detector.

The weight-average molecular weight was calculated using PMMA as a standard substance.

Note that, since the polyethylene resin (C4) has a high molecular weight and contains a component undissolved in trichlorobenzene, measurement of the molecular weight was not made by GPC. Thus, the molecular weight was measured by the viscosity method according to JIS K7367-3.

Examples 1 to 13, Comparative Examples 1 to 6

Resin compositions were prepared such that individual components were contained in the ratios shown in Table 1 or Table 2, and extruded in the conditions shown in Table 1 or Table 2. The resultant resin compositions were subjected to molding under the above conditions to produce molded articles. The evaluation results for the physical properties are shown in Table 1, Table 2 and Table 5.

TABLE 1

|  |  | Example 1 | Example 2 | Example 3 | Example 4 | Example 5 | Example 6 | Example 7 | Example 8 |
|---|---|---|---|---|---|---|---|---|---|
| Polyacetal resin | A1 |  |  |  |  |  |  | 50 | 50 |
|  | A2 |  |  |  |  |  |  |  |  |
|  | A3 | 100 | 100 | 100 | 100 | 100 | 100 | 50 | 50 |
| Glass filler | B1 | 25 | 35 | 35 | 55 | 55 |  | 35 | 35 |
|  | B2 |  |  |  |  |  | 35 |  |  |
|  | B3 |  |  |  |  |  |  |  |  |
| Process | — | 1 | 1 | 2 | 1 | 2 | 1 | 1 | 2 |
| Torque | % | 59 | 70 | 72 | 68 | 71 | 70 | 72 | 74 |
| Deposition | g/hr | <1 | <1 | <1 | <1 | 2 | <1 | <1 | 2 |
| Amount of chips | ppm | 2000 | 2400 | 2800 | 2500 | 3000 | 2900 | 2500 | 3100 |
| Tensile fracture stress | MPa | 135 | 151 | 149 | 179 | 176 | 146 | 150 | 148 |
| Bending elastic modulus | MPa | 7000 | 8200 | 8300 | 10500 | 11000 | 8100 | 8300 | 8400 |
| Ratio of glass filler | — | 20.0 | 25.9 | 25.9 | 35.5 | 35.5 | 25.9 | 25.9 | 25.9 |
| (Tensile fracture stress − 65)/ Glass filler ratio | — | 3.50 | 3.32 | 3.24 | 3.21 | 3.13 | 3.12 | 3.28 | 3.20 |
| Average thickness of component covering the surface of glass filler | μm | 1.3 | 1.3 | 1.2 | 1.0 | 0.8 | 1.1 | 1.0 | 0.8 |
| Creep rupture time | hr | 600 | >2000 | 1700 | >2000 | >2000 | 1700 | 1000 | 700 |
| Wear resistance (depth) against SUS304 ball | μm | 18 | 21 | 22 | 26 | 29 | 23 | 26 | 27 |
| Dynamic friction coefficient against SUS304 ball | — | 0.36 | 0.38 | 0.38 | 0.40 | 0.44 | 0.42 | 0.40 | 0.41 |
| Molding cycle | Cycles | >50 | >50 | >50 | >50 | >50 | >50 | >50 | >50 |

TABLE 2

|  |  | Example 9 | Example 10 | Example 11 | Example 12 | Example 13 | Comparative Example 1 |
|---|---|---|---|---|---|---|---|
| Polyacetal resin | A1 | 100 | 100 | 100 |  |  | 100 |
|  | A2 |  |  |  | 100 |  |  |
|  | A3 |  |  |  |  | 100 |  |
| Glass filler | B1 | 35 | 55 |  | 35 | 80 |  |
|  | B2 |  |  | 35 |  |  |  |
|  | B3 |  |  |  |  |  | 35 |
| Process | — | 1 | 1 | 1 | 1 | 1 | 1 |
| Torque | % | 72 | 71 | 72 | 56 | 71 | 71 |
| Deposition | g/hr | 4 | 6 | 4 | 5 | 4 | 23 |
| Amount of chips | ppm | 4100 | 4800 | 4000 | 4200 | 3300 | 8600 |
| Tensile fracture stress | MPa | 142 | 169 | 141 | 145 | 195 | 128 |
| Bending elastic modulus | MPa | 8300 | 10200 | 8300 | 8400 | 12800 | 8500 |
| Ratio of glass filler | — | 25.9 | 35.5 | 25.9 | 25.9 | 44.4 | 25.9 |
| (Tensile fracture stress − 65)/Glass filler ratio | — | 2.97 | 2.93 | 2.93 | 3.09 | 2.93 | 2.43 |
| Average thickness of component covering the surface of glass filler | μm | 0.3 | 0.3 | 0.3 | 0.4 | 0.9 | 0.0 |
| Creep rupture time | hr | 550 | 760 | 500 | 620 | >2000 | 70 |
| Wear resistance (depth) against SUS304 ball | μm | 26 | 33 | 31 | 25 | 32 | 42 |
| Dynamic friction coefficient against SUS304 ball | — | 0.43 | 0.45 | 0.45 | 0.43 | 0.46 | 0.52 |
| Molding cycle | Cycles | >50 | >50 | 48 | >50 | >50 | 34 |

TABLE 2-continued

|  |  | Comparative Example 2 | Comparative Example 3 | Comparative Example 4 | Comparative Example 5 | Comparative Example 6 |
|---|---|---|---|---|---|---|
| Polyacetal resin | A1 | 100 |  | 100 |  |  |
|  | A2 |  | 100 |  |  |  |
|  | A3 |  |  |  | 100 | 100 |
| Glass filler | B1 |  |  | 35 |  | 5 |
|  | B2 |  |  |  |  |  |
|  | B3 | 55 | 35 |  | 35 |  |
| Process | — | 1 | 1 | 2 | 2 | 1 |
| Torque | % | 69 | 55 | 74 | 71 | 65 |
| Deposition | g/hr | 29 | 28 | 12 | 15 | <1 |
| Amount of chips | ppm | 10000 | 10600 | 6000 | 6500 | 1900 |
| Tensile fracture stress | MPa | 141 | 128 | 139 | 138 | 82 |
| Bending elastic modulus | MPa | 11500 | 8600 | 8400 | 8500 | 3700 |
| Ratio of glass filler | — | 35.5 | 25.9 | 25.9 | 25.9 | 4.8 |
| (Tensile fracture stress − 65)/Glass filler ratio | — | 2.14 | 2.43 | 2.85 | 2.82 | 3.57 |
| Average thickness of component covering the surface of glass filler | μm | 0.0 | 0.0 | 0.1 | 0.1 | 1.2 |
| Creep rupture time | hr | 120 | 90 | 280 | 200 | 50 |
| Wear resistance (depth) against SUS304 ball | μm | 52 | 41 | 28 | 34 | 27 |
| Dynamic friction coefficient against SUS304 ball | — | 0.59 | 0.51 | 0.48 | 0.46 | 0.36 |
| Molding cycle | Cycles | 32 | 38 | 40 | 34 | >50 |

In Examples 1 to 13, the average thickness of a resin covering the surface of the glass filler (B) fell within the range of 0.2 μm to 3.0 μm. Owing to this, creep resistance, wear resistance, sliding property and molding productivity were improved.

Of them, like Examples 1 to 8 and Example 13, in the case where a polyacetal resin (A3) having a block component was used as the polyacetal resin (A) and glass filler (B1 or B2) modified by a film-forming agent containing acid was used as the glass filler (B), the average thickness of a component covering the surface of the glass filler (B) became as large as 0.8 μm or more. Owing to this, not only creep resistance and sliding property were further improved but also amounts of deposition and chips during a production process were successfully decreased.

In contrast, Comparative Examples 1 to 5, the average thickness of a component covering the surface of the glass filler (B) was less than 0.2 μm.

Of them, like Comparative Examples 1 to 3, in the case where a polyacetal resin (A3) having a block component was not used as the polyacetal resin (A) and a glass filler (B1 or B2) modified with a film-forming agent containing acid was not used as the glass filler (B), resin coating over the surface of the glass filler (B) was not observed. In this case, not only creep resistance, wear resistance, sliding property and molding productivity decreased but also the amounts of deposition and chips during a production process increased.

When Example 9 is compared to Comparative Example 4, it was found that, the average thickness of a resin covering the surface of the glass filler (B) tends to increase by use of Process 1 in which the kneading time after the glass filler (B) is introduced is long.

When Example 1 is compared to Comparative Example 6, it was found that in Comparative Example 6 where the amount of glass filler (B) is low, even if the average thickness of the resin covering the surface of the glass filler (B) is as sufficient as 1.2 μm, the effect of improving creep resistance cannot be obtained Examples 14 to 26, Comparative Examples 7 to 9

Resin compositions were prepared such that individual components were contained in the ratios shown in Table 3 or 4, and extruded in the conditions shown in Table 3 or 4. The resulting resin compositions were subjected to molding under the above conditions to produce molded articles. The evaluation results for the physical properties are shown in Table 3 to Table 5.

TABLE 3

|  |  | Example 14 | Example 15 | Example 16 | Example 17 | Example 18 | Example 19 | Example 20 | Example 21 |
|---|---|---|---|---|---|---|---|---|---|
| Polyacetal resin | A1 | 100 | 100 |  |  |  |  |  |  |
|  | A2 |  |  |  |  |  |  |  |  |
|  | A3 |  |  | 100 | 100 | 100 | 100 | 100 | 100 |
| Glass filler | B1 | 35 | 35 | 35 | 35 | 35 | 35 | 55 | 55 |
|  | B2 |  |  |  |  |  |  |  |  |
|  | B3 |  |  |  |  |  |  |  |  |
| Polyethylene resin | C1 | 2 |  | 1 | 2 | 2 | 5 | 2 | 2 |
|  | C2 |  |  |  |  |  |  |  |  |
|  | C3 |  |  |  |  |  |  |  |  |
|  | C4 |  | 2 |  |  |  |  |  |  |
| Process | — | 1 | 1 | 1 | 1 | 2 | 1 | 1 | 2 |
| Torque | % | 63 | 71 | 64 | 61 | 62 | 54 | 59 | 60 |
| Deposition | g/hr | <1 | 19 | <1 | <1 | <1 | <1 | <1 | <1 |
| Amount of chips | ppm | 2900 | 5200 | 1900 | 1500 | 1700 | 1500 | 2100 | 2600 |
| Tensile fracture stress | MPa | 141 | 140 | 149 | 147 | 148 | 140 | 173 | 175 |

TABLE 3-continued

|  |  | Example 14 | Example 15 | Example 16 | Example 17 | Example 18 | Example 19 | Example 20 | Example 21 |
|---|---|---|---|---|---|---|---|---|---|
| Bending elastic modulus | MPa | 8100 | 8100 | 8100 | 8100 | 8200 | 8000 | 10200 | 10400 |
| Ratio of glass filler | — | 25.5 | 25.5 | 25.7 | 25.5 | 25.5 | 25.0 | 35.0 | 35.0 |
| (Tensile fracture stress − 65)/Glass filler ratio | — | 2.97 | 2.94 | 3.26 | 3.21 | 3.25 | 3.00 | 3.08 | 3.14 |
| Average thickness of component covering the surface of glass filler | μm | 0.3 | 0.3 | 1.1 | 1.2 | 1.0 | 1.1 | 1.0 | 0.7 |
| Surface polyethylene ratio | — | 1.09 | 0.98 | 1.11 | 1.12 | 1.12 | 1.13 | 1.10 | 1.09 |
| Creep rupture time | hr | 420 | 290 | >2000 | >2000 | 1700 | 1200 | >2000 | >2000 |
| Wear resistance (depth) against SUS304 ball | μm | 8 | 14 | 6 | 4 | 5 | 2 | 5 | 6 |
| Dynamic friction coefficient against SUS304 ball | — | 0.20 | 0.32 | 0.21 | 0.16 | 0.16 | 0.14 | 0.16 | 0.18 |
| Molding cycle | Cycles | >50 | 48 | >50 | >50 | >50 | >50 | >50 | >50 |

TABLE 4

|  |  | Example 22 | Example 23 | Example 24 | Example 25 | Example 26 | Comparative Example 7 | Comparative Example 8 | Comparative Example 9 |
|---|---|---|---|---|---|---|---|---|---|
| Polyacetal resin | A1 |  |  |  |  | 50 | 100 | 100 |  |
|  | A2 |  |  |  |  |  |  |  | 100 |
|  | A3 | 100 | 100 | 100 | 100 | 50 |  |  |  |
| Glass filler | B1 | 35 | 35 | 35 |  | 35 |  |  |  |
|  | B2 |  |  |  | 35 |  |  |  |  |
|  | B3 |  |  |  |  |  | 35 | 35 | 35 |
| Polyethylene resin | C1 |  |  |  | 2 | 2 | 2 |  |  |
|  | C2 | 2 |  |  |  |  |  |  |  |
|  | C3 |  | 2 |  |  |  |  |  |  |
|  | C4 |  |  | 2 |  |  |  | 2 | 2 |
| Process | — | 1 | 1 | 1 | 1 | 1 | 1 | 1 | 1 |
| Torque | % | 64 | 68 | 69 | 63 | 62 | 63 | 70 | 57 |
| Deposition | g/hr | <1 | 3 | 8 | <1 | <1 | 3 | 32 | 39 |
| Amount of chips | ppm | 2100 | 2200 | 3900 | 2200 | 1900 | 6700 | 10300 | 11100 |
| Tensile fracture stress | MPa | 145 | 145 | 143 | 142 | 149 | 115 | 117 | 120 |
| Bending elastic modulus | MPa | 8200 | 8100 | 8100 | 8000 | 8300 | 8400 | 8300 | 8400 |
| Ratio of glass filler | — | 25.5 | 25.5 | 25.5 | 25.5 | 25.5 | 25.5 | 25.5 | 25.5 |
| (Tensile fracture stress − 65)/Glass filler ratio | — | 3.13 | 3.13 | 3.05 | 3.01 | 3.29 | 1.96 | 2.04 | 2.15 |
| Average thickness of component covering the surface of glass filler | μm | 1.1 | 1.1 | 1.0 | 0.9 | 0.9 | 0.0 | 0.0 | 0.0 |
| Surface polyethylene ratio | — | 1.06 | 1.03 | 1.00 | 1.12 | 1.11 | 1.10 | 0.98 | 0.96 |
| Creep rupture time | hr | >2000 | 1800 | 1350 | 1600 | 900 | 50 | 60 | 40 |
| Wear resistance (depth) against SUS304 ball | μm | 7 | 6 | 12 | 6 | 5 | 10 | 19 | 18 |
| Dynamic friction coefficient against SUS304 ball | — | 0.22 | 0.20 | 0.29 | 0.17 | 0.17 | 0.20 | 0.26 | 0.26 |
| Molding cycle | Cycles | >50 | >50 | >50 | >50 | >50 | 42 | 38 | 40 |

In Examples 14 to 26, the average thickness of a resin covering the surface of the glass filler (B) fell within the range of 0.2 μm to 3.0 μm and satisfactory creep resistance, wear resistance, sliding property and molding productivity were obtained. Furthermore, in these Examples containing a polyethylene (C), wear resistance and sliding property were more improved.

From comparison between Examples 14 and 15 and comparison between Examples 17, 22, 23 and 24, when a polyethylene (C1, C2 or C3) having a weight-average molecular weight of 500,000 or less was used, it was found that polyethylene is easily localized in the surface of a molded article, sliding property and wear resistance can be more improved.

In contrast, in Comparative Examples 7 to 9, since a polyacetal resin having a block component (A3) was not used as the polyacetal resin (A) and a glass filler (B1 or B2) modified with a film-forming agent containing acid was not used as the glass filler (B), resin coating over the surface of the glass filler (B) was not observed. In this case, creep resistance decreased, and the amounts of deposition and chips increased at the time of manufacture.

TABLE 5

|  |  | Example 2 | Example 4 | Example 17 | Example 20 | Comparative Example 1 | Comparative Example 8 |
|---|---|---|---|---|---|---|---|
| Polyacetal resin | A1 |  |  |  |  | 100 | 100 |
|  | A2 |  |  |  |  |  |  |
|  | A3 | 100 | 100 | 100 | 100 |  |  |
| Glass filler | B1 | 35 | 55 | 35 | 55 |  |  |
|  | B2 |  |  |  |  |  |  |
|  | B3 |  |  |  |  | 35 | 35 |
| Polyethylene resin | C1 |  |  | 2 | 2 |  |  |
|  | C2 |  |  |  |  |  |  |
|  | C3 |  |  |  |  |  |  |
|  | C4 |  |  |  |  |  | 2 |
| Process | — | 1 | 1 | 1 | 1 | 1 | 1 |
| Dynamic friction coefficient (initial sliding property) against a SUS304 ball) | — | 0.33 | 0.35 | 0.12 | 0.14 | 0.40 | 0.36 |
| Dynamic friction coefficient against SS400 flat plate | — | 0.34 | 0.35 | 0.24 | 0.26 | 0.42 | 0.32 |
| Dynamic friction coefficient between the same materials | — | 0.52 | 0.55 | 0.28 | 0.29 | 0.78 | 0.42 |
| Cantilever bending vibration fatigue | kgf/m2 | 42 | 50 | 42 | 50 | 28 | 25 |
| SFD | cm | 28 | 26 | 30 | 31 | 23 | 22 |

The present application was based on Japanese Patent Application No. 2014-070201 filed Mar. 28, 2014, the contents of which are incorporated herein by reference.

INDUSTRIAL APPLICABILITY

The polyacetal resin composition and molded article of the present invention have industrial applicability in a variety of fields in which a polyacetal resin is suitably used, particularly, in the field of the automobile mechanical parts requiring durability and sliding property.

The invention claimed is:

1. A molded article formed from a polyacetal resin composition containing 100 parts by mass of a polyacetal resin (A) and 10 parts by mass or more and 100 parts by mass or less of a glass filler (B) wherein, at least one acid is contained as a material having a function of modifying the surface of the glass filler (B) and wherein, when the molded article is fractured by application of tensile force, the surface of the glass filler (B) protruding from a fractured surface of a fractured molded article is covered with a component comprising the polyacetal resin (A) having an average thickness of 0.7 μm or more and 3.0 μm or less,
   wherein the polyacetal resin (A) contains a block component including a hydrogenated polybutadiene component.

2. The molded article according to claim 1, wherein the molded article further contains a polyethylene resin (C) having a weight-average molecular weight of 500,000 or less in an amount of 0.5 parts by mass or more and 8 parts by mass or less based on 100 parts by mass of the polyacetal resin (A).

3. The molded article according to claim 2, wherein the polyethylene resin (C) having a weight-average molecular weight of 500,000 or less has a melting point of 115° C. or less.

4. The molded article according to claim 1, wherein the acid is carboxylic acid.

5. The molded article according to claim 1, wherein the molded article further contains a polyethylene resin (C) having a weight-average molecular weight of 500,000 or less; an amount of the polyethylene resin (C) having a weight-average molecular weight of 500,000 or less in a surface layer of the molded article is larger than an amount of the polyethylene resin (C) having a weight-average molecular weight of 500,000 or less in a layer surface deeper than 1,000 μm from the surface layer of the molded article as measured by cutting out the layer.

6. A method for preparing the molded article according to claim 1, comprising a step of modifying a surface of the glass filler (B) with the material containing the at least one acid, and a step of mixing the modified glass filler and the polyacetal resin (A).

* * * * *